March 11, 1969     L. PERAS     3,432,651
APPARATUS TO GENERATE CURVES BY ELEMENTAL ARCS
Filed June 5, 1964
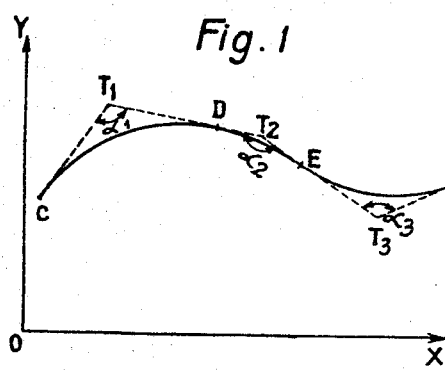
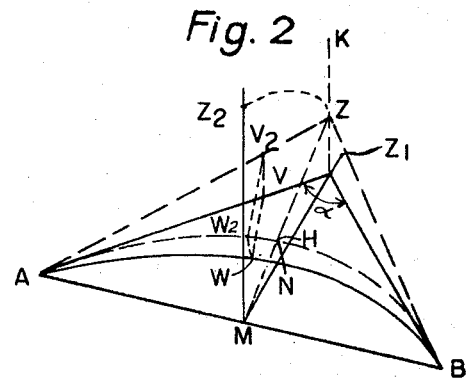
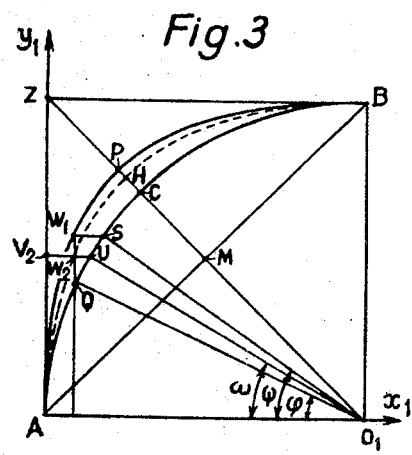
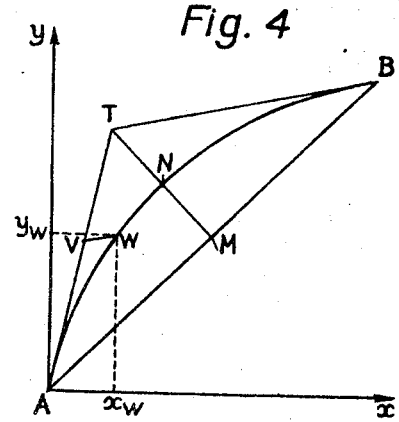
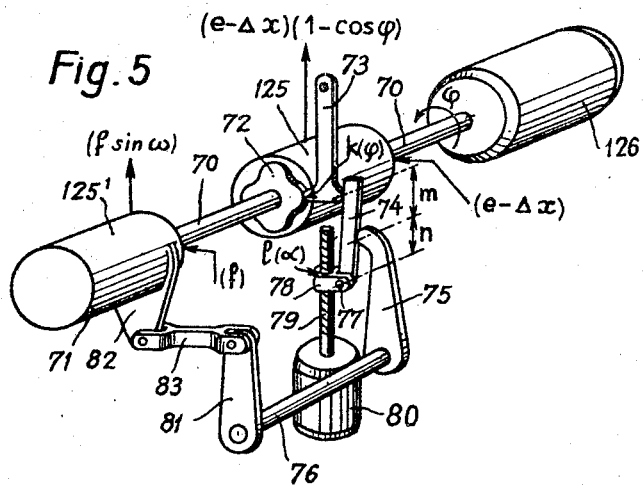
Inventor
Lucien Peras
By Stevens, Davis, Miller + Mosher
Attorneys

United States Patent Office 3,432,651
Patented Mar. 11, 1969

3,432,651
APPARATUS TO GENERATE CURVES BY ELEMENTAL ARCS
Lucien Peras, Billancourt, France, assignor to Regie Nationale des Usines Renault, Billancourt, France
Filed June 5, 1964, Ser. No. 372,768
Claims priority, application France, June 13, 1963, 938,052
U.S. Cl. 235—197
Int. Cl. G06g 7/26
3 Claims

ABSTRACT OF THE DISCLOSURE

An apparatus for generating a curve by means of elemental arcs, wherein each elemental arc is defined by the coordinates of its terminal points and of the intersection point of the two tangents thereto. The apparatus comprises an analogue computer formulating quantities representing successive points of each elemental arc by translating a parametric equation whose terms are bound up with the aforesaid coordinates, said parametric equation taking the form:

$$x=(X_B-X_T)(1-\cos\varphi)+(X_T-X_A)\sin\omega$$
$$y=(Y_B-Y_T)(1-\cos\varphi)+(Y_T-Y_A)\sin\omega$$

where $\omega=\varphi+k(\varphi)l(\alpha)$ and in which $$X_A, X_B, X_T, Y_A, Y_B, Y_T$$

are the Cartesian coordinates of the limit points A–B of each elemental arc and of the intersection point T of the tangents to said arc at A and B, $\varphi$ is a parametric angle variable between 0 and $\pi/2$, $\alpha$ the angle subtended by the tangents TA, TB, $l(\alpha)$ a coefficient varying from 0 to 1 as $\alpha$ varies from 90 to 180°, and $k(\varphi)$ a function representing the angular difference between the two vector radii of a quadrant drawn to the points of intersection of said quadrant with two lines parallel to the quadrant marginal radii, drawn from a locus point of the parabolic arc which circumscribes that quadrant and whose tangents at its extremities are the same as those of the quadrant.

My copending patent application No. 254,641, filed on Jan. 29, 1963, relates to a curve generating method, applicable to tracing or milling machines and including the basic steps, after determination of the curve from data relevant to elemental arcs thereof;

Of successively recording the data relevant to said elemental arcs in a digital system;

Of feeding this data in respect of each elemental arc into an analogue computer and causing the latter to formulate, for the purpose of controlling a tracing system in known manner, the quantities representing the coordinates of successive points on said elemental arc, from a parametric curve equation whose terms include the data pertaining to the locus points of said elemental arc;

Of measuring and comparing the data relating to the point reached at the end of an elemental arc tracing operation with those recorded as having to be obtained; and Of feeding the differences resulting from this comparison into the analogue computer in order to effect compensation therefor in the process of generating the next elemental arc.

Preferably, each elemental arc is defined by its terminal points and by the intersection point of the two tangents thereto, while the parametric equation adopted for the computer is chosen by considering each elemental arc as an anamorphosis of a basic curve.

The above said patent application describes a solution according to which the basic curve is a quadrant and the anamorphosis adopted the oblique projection thereof, thus leading to a parametric equation which is easy to translate into analogue computer terms.

When such is the case, the arcs obtained will be elliptic arcs, and if it is desired to engender a curve formed of a sequence of elemental arcs which are as near to circular arcs as possible, recourse must be had to a more favourable parametric equation. This is precisely the object of the present invention, for such an equation must embody a plurality of basic curves because, as will be seen, the most favourable basic curve differs with the angle subtended by the two tangents to the limit points of each elemental arc, it being borne in mind that the equation must remain translatable analogically in simple fashion.

Essentially, the present invention relates to a method of generating a curve by elemental arcs in accordance with the above mentioned patent application in which method each elemental arc is defined by the coordinates of its terminal points and of the intersection point of the two tangents thereto, and recourse is had, for each system of coordinates, to an analogue computer which formulates quantities representing successive points of each elemental arc by translating a parametric equation whose terms are bound up with the aforesaid coordinates, said method being characterized in that said parametric equation takes the form:

$$x=(X_B-X_T)(1-\cos\varphi)+(X_T-X_A)\sin\omega$$
$$y=(Y_B-Y_T)(1-\cos\varphi)+(Y_T-Y_A)\sin\omega$$

where:
$\omega=\varphi+k(\varphi)l(\alpha)$ and in which $$X_A, X_B, X_T, Y_A, Y_B, Y_T$$

are the Cartesian coordinates of the limit points A–B of each elemental arc and of the intersection point T of the tangents to said arc at A and B, $\varphi$ is a parametric angle variable between 0 and $\pi/2$, $\alpha$ the angle subtended by the tangents TA, TB, $l(\alpha)$ a coefficient varying from 0 to 1 as $\alpha$ varies from 90 to 180°, and $k(\varphi)$ a function representing the angular difference between the two vector radii of a quadrant drawn to the points of intersection of said quadrant with two lines parallel to the quadrant marginal radii, drawn from a locus point of the parabolic arc which circumscribes that quadrant and whose tangents at its extremities are the same as those of the quadrant.

The method according to the present invention and an example of a form of embodiment of apparatus for performing the same will be described hereinbelow with reference to the accompanying drawing, in which:

FIGURE 1 is a graph for the generation of a curve consisting of a sequence of circular arcs;

FIGURE 2 is a perspective view showing a circular arc to be generated and the basic curve of which it is the projection;

FIGURE 3 is a graph showing the evolution of the basic curve:

FIGURE 4 is a graph showing an elemental circular arc of the curve to be generated; and FIGURE 5 is a schematic perspective view of the computer mechanism for providing an analogue interpretation of the parametric equation.

FIGURE 1 illustrates a curve to be generated by tracing or machining, showing the manner in which it can be predetermined in the form of a sequence of circular arcs CD, DE, EF which will hereinafter be defined, with reference to the coordinates OX, OY, by the coordinates of their terminal points C, D, E, etc., and by the coordinates of the intersection points $T_1$, $T_2$, $T_3$, etc., of the tangents to the points C, D, E, etc., said tangents being such that the vertex angles $\alpha_1$, $\alpha_2$, $\alpha_3$ be confined to between 90° and 180°, it being understood that this data can be obtained without the need to plot the curve precisely. Within the context of this form of curve predetermination, the general case of an elemental arc to be generated will first be discussed with reference to the perspective view of FIGURE 2, in which ANB is an elemental circular arc to be generated, together with its two equal tangents AT and BT subtending an angle $\alpha$, and TK is a perpendicular to the plane ATB, on which is determined a point Z such that $MZ=MA=MB$ (M being the midpoint of line AB), i.e., such that the angle AZB is a right angle, whereby the arc ANB may be regarded as the orthogonal projection of a curve AHB which is an elliptic arc.

As $\alpha$ varies from 90° to 180° it will be seen that the point T shifts from $Z_1$ to M, $Z_1$ being such that $MZ=MA=MB$, and that the point Z shifts from $Z_1$ to $Z_2$ along the quadrant whose center is M and radius $MZ_1$.

It can easily be demonstrated that the curve AHB, of which ANB is the projection, then evolves between a quadrant (point $Z_1$, angle $\alpha=90°$) and a parabola (point $Z_2$, angle $\alpha=180°$, i.e., T lies on M). Between these two extremes, the basic curve AHB, whose projection is a circular arc, is a variable elliptic arc.

FIGURE 3 is an orthogonal projection of the evolution of this basic curve from the quadrant ACB whose center is $O_1$ and radius $O_1A=R$, to the parabolic arc APB. All the intermediate curves are elliptic arcs and pass through a point H lying between C and P. (For greater clarity in the figure, the differences between the curves have been deliberately exaggerated).

As $\alpha$ tends toward 180°, the elliptic arc degenerates into a parabolic arc whose parametric equation (coordinates of the locus point $W_1$) is $$x=R \sin^4 \theta$$
$$y=R(1-\cos^4 \theta)$$

where $\theta$ is a parametric angle variable between 0 and $\pi/2$ but which cannot be represented on the figure.

It would be possible to establish a general formula representing the various intermediate elliptic arcs between the circular arc ACB and the parabolic arc APB, but a concrete embodiment of these equations would lead to considerable complication of the mechanical and electrical devices. This complication can be avoided by substituting for such elliptic arcs curves obtained by interpolation between ACB and APB.

If Q and S are the points at which lines drawn from $W_1$ parallel to the coordinate axes intersect the quadrant ACB, and if $\varphi$ is taken to designate the angle $AO_1Q$ and $\psi$ the angle $AO_1S$, FIGURE 3 shows that:

$$x_1=R \sin^4 \theta = R(1-\cos \varphi)$$
$$y_1=R(1-\cos^4 \theta) = R \sin \psi$$

and also that to any determinate angle $\varphi$ there corresponds a likewise determinate angle $\psi$.

The difference $\psi-\varphi$ can then be expressed as a function of $\varphi$ by:

$$\psi-\varphi=k(\varphi)$$

and the parametric equation of the parabolic arc APB can be put into the simple form $$x_1=R(1-\cos \varphi)$$
$$y_1=R \sin \psi$$

where $\psi=\varphi+k(\varphi)$.

Considering now on FIGURE 3 an intermediate elliptic arc passing through the point H, it will be seen that to the locus point $W_2$ (located on the vertical dropped from $W_1$) of this elliptic arc there correspond the points Q and U on the quadrant ACB, and the angle $\varphi$ and $\omega$.

Since the difference $\psi-\varphi$ is at the most equal to 8°, the curvilinear triangles $QW_1S$ and $QW_2U$ can be regarded as being rectilinear triangles, and the error involved in taking $$\frac{QU}{QS}=\frac{QW_2}{QW_1}=\frac{CH}{CP}$$

is only very small and less than the degree of precision sought within the context of the present invention; whence $$\omega-\varphi=(\omega-\varphi)\frac{CH}{CP}=k(\varphi)\frac{CH}{CP}$$

But since $CH/CP$ is a function of the angle $\alpha$ subtended by the tangents to the arc of the curve to be generated, one may finally write $$\omega-\varphi=k(\varphi)l(\alpha)$$

where $l(\alpha)$ is a coefficient variable between 0 and 1, the value 0 corresponding to $\alpha=90°$ and the value 1 to $\alpha=180°$.

From the foregoing, it emerges that the approximate parametric equation of the variable elliptic arc to be used as the basic curve is $$x=R(1-\cos \varphi)$$
$$y=R \sin \omega$$

where $\omega=\varphi+k(\varphi)l(\alpha)$.

Referring once more to FIGURE 2, considering now the locus point $W_2$ of elliptic arc AHB corresponding to the point W of circular arc ANB, and the projection $V_2$ of $W_2$ on AZ (to which corresponds the point V on AT), then on the basis of FIGURE 3 one may write:

$$\frac{AV_2}{AZ}=\sin \omega$$

$$\frac{V_2W_2}{ZB}=\frac{AO_1-O_1Q \cos \varphi}{ZB}=1-\cos \varphi$$

in which $AV_2=AZ \sin \omega$ and $V_2W_2=ZB(1-\cos \varphi)$.

Therefore, the parametric equation of the arc ANB, i.e., of the locus point W, in the $xAy$ system of coordinates (see FIGURE 4), consisting of two axes $Ax$ and $Ay$ passing through the point A and respectively parallel to the axes OX, OY of FIGURE 1, will be given by:

$$x_W=(X_B-X_T)(1-\cos \varphi)+(X_T-X_A) \sin \omega$$
$$y_W=(Y_B-Y_T)(1-\cos \varphi)+(Y_T-Y_A) \sin \omega$$

in which $\omega=\varphi+k(\varphi)l(\alpha)$.

Thus any elemental arc such as ANB can be generated by means of this parametric equation by causing $\varphi$ to vary from 0 to $\pi/2$, provided that the coordinates of A, B, T and the angle $\alpha$ deduced therefrom are known.

If, as explained in the patent application cited hereinabove in order to compensate for a possible deviation which may occur after the previous arc has been drawn, one introduces into this equation the algebraic differences $\Delta x$ and $\Delta y$ possibly affecting the coordinates at the origin A, then since these differences can be introduced into the first or second term of the right-hand side of the equation, and taking $$e=X_B-X_T$$
$$f=X_T-X_A$$
$$g=Y_B-Y_T$$
$$h=Y_T-Y_A$$

one arrives at the following equation:

$$x_W=(e-\Delta x)(1-\cos \varphi)+f \sin \omega$$
$$y_W=(g-\Delta y)(1-\cos \varphi)+h \sin \omega$$

where $\omega=\varphi+k(\varphi)l(\alpha)$.

It will be appreciated that this equation is similar to that given in the said patent application, except that the parametric angle $\varphi$ must be corrected by a certain quantity $k(\varphi)l(\alpha)$ before it is introduced into the second term of the right-hand sides of the two equations giving $x$ and $y$, respectively.

As in the said patent application, such a parametric equation can readily be expressed in analogue terms by recourse to resolvers well known per se (for instance of the type having a transformer with rotating primary winding), which are adapted in this case to translate the parametric angles $\varphi$ and $\omega$ and which may be devised as shown in FIGURE 5 in the exemplary case of generation of the x-function.

The device illustrated, which must be regarded as being intended as a substitute for the 25–25¹–26 system of the said patent application, comprises a variable speed motor-reduction unit 126 whose function is to introduce the $\varphi$ parameter into the resolvers 125 and 125¹ through the agency of the shaft 70 rotatably connected to the rotating winding of each resolver.

The resolver 125, into which is additionally introduced, originating from a digital-analogue transformer (not shown), an electrical quantity representing $e-x$, an example being a corresponding voltage applied to the rotating primary winding of the resolver, is thus able to deliver through its secondary winding an electrical output quantity representing the equation term $$(e-\Delta x)(1-\cos \varphi)$$

The resolver 125¹, into which is likewise introduced, originating from said digital-analogue transformer, a quantity representing $f$, an example being a corresponding voltage applied to the rotating primary winding of the resolver, additionally has its secondary output winding, which is rigid with the resolver casing 71, subjected to a mechanism whose function is to introduce, at each cyclic variation of $\varphi$ by $\pi/2$, the variable angular difference $\omega-\varphi$, whereby said resolver is caused to deliver via its secondary winding an electrical output quantity representing the ($f \sin \omega$) equation term. A four-lobe cam 72 is accordingly mounted on the shaft 70 connecting the resolver rotating windings, and each of said lobes is so contoured as to impart to an oscillating hanging lever 73 bearing against said contours an annular displacement proportional to the aforesaid function $k(\varphi)$. This displacement is transmitted in turn to the resolver casing 71 thereby introducing the said coefficient $l(\alpha)$, which is variable from 0 to 1 as already stated, through a continuously variable reducing transmission. The transmission is in this case effected through the medium of an oscillating reduction lever 74 bearing against the lever 73, and thence to an oscillating lever 75 keyed to a shaft 76. The lever 74 is pivotally connected at 77 to a slide 78 (the guide means therefor being omitted) consisting of a nut cooperating with a screw-type control 79 driven by a motor 80, the displacement of said nut being here intended to vary the distance $n$ of the contact point of levers 75, 74 from the pivotal point 77 of lever 74 by an amount ranging from 0 to an amount equal to the distance $m$ of the contact point of levers 75, 74 from that of levers 74, 73, whereby the transmission ratio given by the respective displacements of oscillating levers 73 and 75, and which is equal to $n/m+n$, is variable between 0 and 0.5. Since the coefficient $l(\alpha)$ varies from 0 to 1, an intermediate step-up linkage is initiated from the shaft 76, consisting of a lever 81 keyed to the shaft 76 and which is connected to a lever 82 rigid with the casing of resolver 125¹ through the medium of a link 83, this linkage stepping up the transmission in the ratio of 2:1 (the lever 81 being twice as long as the lever 82). In the process of generating each elemental arc, the motor 80 is thus designed to translate the coefficient $l(\alpha)/2$ and is accordingly slaved to known control means of the digital or analogue type (not shown) for determinately positioning the slide 78 respectively to the value of the angle $\alpha$ which is determined from the coordinates of the points A, B, T of each elemental arc and which can therefore appear on the programming tape along with the information e–f–g–h relevant to each elemental arc, or be deduced therefrom by an intermediate computer which processes this information whereby to energize the motor 80 through the medium of said digital or analogue control means.

As illustrated in the said patent application, the summed analogue quantities issuing from resolvers 125 and 125¹ are delivered to a comparator which governs in known manner the displacement of a machine member mobile in X as a function of the difference between the considered analogue quantity representing the x-function and an analogue quantity issuing from translator means of the position of said mobile member, the present invention being obviously applicable in conjunction with all the other arrangements described in the above said patent application.

Lastly, whilst the present invention relates more particularly to the generation of a curve consisting of a sequence of circular arcs, the tangents to the extremities of each of which are therefore equal, the method hereinbefore described as well as the apparatus for performing the same are fully applicable in cases where the tangents drawn from $T_1$, $T_2$, $T_3$, etc., are not strictly equal, in which case the parametric equations will then represent, without modifictaion, the oblique rather than the orthogonal projection of an elliptic arc variable as already stated, and this projection will consequently be an elliptic arc which very closely approximates a circular arc and is consequently entirely satisfactory.

The method of this invention is thus applicable without the prior calculations or precise tracing which would otherwise be necessary if strict equality of the tangents were required.

I claim:

1. Apparatus for generating a curve in which each elemental arc is defined by the coordinates of its terminal points and of the intersection point of the two tangents thereto, comprising an analogue computer for translating a parametric equation, said computer formulating quantities representing successive points of each elemental arc by translating a parametric equation whose terms are bound up with the aforesaid coordintaes, said parametric equation taking the form:

$$x=(X_B-X_T)(1-\cos \varphi)+(X_T-X_A) \sin \omega$$
$$y=(Y_B-Y_T)(1-\cos \varphi)+(Y_T-Y_A) \sin \omega$$

where $\omega=\varphi+k(\varphi)l(\alpha)$ and in which $$X_A, X_B, X_T, Y_A, Y_B, Y_T$$

are the Cartesian coordinates of the limit points A–B of each elemental arc and of the intersection point T of the tangents to said arc at A and B, $\varphi$ is a parametric angle variable between 0 and $\pi/2$, $\alpha$ the angle subtended by the tangents TA, TB, $l(\alpha)$ a coefficient varying from 0 to 1 as $\alpha$ varies from 90 to 180°, and $k(\varphi)$ a function representing the angular difference between the two vector radii of a quadrant drawn to the points of intersection of said quadrant with two lines parallel to the quadrant marginal radii, drawn from a locus point point of the parabolic arc which circumscribes that quadrant and whose tangents at its extremities are the same as those of the quadrant, said computer comprising first and second rotatable resolvers for each system of coordinates, said resolvers being driven by a variable-speed motor reduction unit for introducing the parametric angle $\varphi$, said first resolver translating the first term of the right-hand side of the equation and said second resolver translating the second term of the right-hand side of the equation, a mechanism actuated by said reduction unit and adapted to introduce into said second resolver, at each cyclic variation of $\varphi$ by $\pi/2$, the angular difference $\omega-\varphi=k(\varphi)l(\alpha)$.

2. Apparatus as claimed in claim 1, wherein said mechanism further comprises a four-lobe cam adapted to impart to a first oscillating lever at each rotation through $\pi/2$, an angular displacement which is a function of $k(\varphi)$, a motor driven reduction unit operatively connected to drive said cam, a second oscillating lever operatively connected to said first lever to transmit said displacement to a third oscillating lever which is connected to a part of the second resolver not rotated by said motor, said second oscillating lever being movable in a plane containing the other two levers to thereby vary the transmission ratio between the first and the third levers by an amount ranging from zero upwards and thereby introduce the coefficient $l(\alpha)$, whereby said nonrotated part of the second resolver sustains a displacement corresponding to said angular difference $\omega - \varphi$.

3. Apparatus as claimed in claim 2 in which said second oscillating lever is pivotally connected to a displaceable slide, control means responsive to the value of the angle $\alpha$ applied thereto, said control means controlling the displacement of said slide.

References Cited

UNITED STATES PATENTS

| 2,849,184 | 8/1958 | Frederick et al. | 235—150.27 |
| 2,889,270 | 6/1961 | Waldow | 235—61.5 |
| 3,000,567 | 9/1961 | Houghton | 235—197 |
| 3,051,389 | 8/1962 | Fayard | 235—197 |

MARTIN P. HARTMAN, *Primary Examiner.*

U.S. Cl. X.R.

235—184, 151.11